Figure 1:
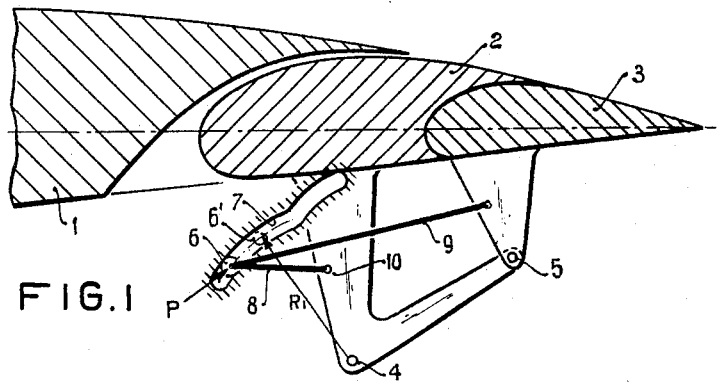

Oct. 13, 1959     L. J. DE WOLFF     2,908,454
AIRCRAFT WING

Filed Feb. 8, 1955                                                3 Sheets-Sheet 1

Inventor:
LAMBERTUS J. de WOLFF
By Ernest P. Montague
Attorney

Oct. 13, 1959     L. J. DE WOLFF     2,908,454
AIRCRAFT WING

Filed Feb. 8, 1955     3 Sheets-Sheet 2

Inventor:
LAMBERTUS J. de WOLFF

By Ernest J. Montague
Attorney

Oct. 13, 1959 — L. J. DE WOLFF — 2,908,454
AIRCRAFT WING
Filed Feb. 8, 1955 — 3 Sheets-Sheet 3

Inventor:
LAMBERTUS J. de WOLFF
By Ernest F. Montague
Attorney

United States Patent Office

2,908,454
Patented Oct. 13, 1959

2,908,454

AIRCRAFT WING

Lambertus J. de Wolff, Zwanenburg, Netherlands, assignor to N. V. Koninklijke Nederlandsche Vliegtuigenfabriek Fokker, Schiphol, Amsterdam, Netherlands Application February 8, 1955, Serial No. 486,887

Claims priority, application Netherlands February 17, 1954

6 Claims. (Cl. 244—42)

The present invention relates to an aircraft wing having at the trailing portion a main flap and an auxiliary flap, said flaps joining the wing in the position for normal flight, the main flap and the auxiliary flap being turned as a unit with respect to the wing for taking off and for approaching and the auxiliary flap being turned with respect to the main flap for landing, said movements of the main flap and the auxiliary flap being derived from the same force, supplied by an actuating mechanism. An aircraft wing of this construction is known from U.S. Patent No. 2,404,956. As the movements of the main flap and the auxiliary flap are derived from the same actuating mechanism it shows the advantage that wrong or undesired positions of the flaps are avoided. The mechanical couplings between the actuating mechanism and the flaps as applied with the known construction are rather complicated.

It is, therefore, one object of the present invention to provide a simplification of the mechanical couplings between the actuating mechanism and the flaps, so that a more reliable operation is obtained.

It is another object of the present invention to provide an aircraft wing in which the auxiliary flap is carried by transverse hinge shaft of the main flap which in its turn is carried by a stationary transverse hinge shaft, whilst the actuating force acts on a guiding roll guided by a stationary guide path, said guiding roll being coupled to the main flap and the auxiliary flap by a rod system. This construction brings about an important simplification of the actuating mechanism of the flaps.

It is still another object of the present invention to provide an aircraft wing, in which the guiding roll guided by the guide path is coupled to the main flap by a first swing rod and to the auxiliary flap by a second swing rod, whilst the first portion of the guide path consists of an arc having the first transverse hinge shaft as centre, and the second part of the guide path consists of an arc having as center the point connecting the main flap, in the position for approaching, to the first-mentioned swing rod, and as radius the length of this rod.

It is yet another object of the present invention to provide an aircraft wing, in which the guiding roll is coupled to a stationary arm of the auxiliary flap, whilst the first portion of the guiding path consists of an arc having the first transverse hinge shaft as center, and the second portion of the guide path consists of an arc having as center the second transverse hinge shaft in the position occupied by the main flap for approaching.

It is a further object of the present invention to provide an aircraft wing in which the guide roll is connected to one extremity of a two-armed lever which is, between the two extremities, hingedly connected to the main flap, the other arm of the lever being engaged by the actuating force, said other arm being connected by a swing rod to the auxiliary flap, the first portion of the guide path consisting of an arc having the first transverse hinge shaft as center, whilst the second portion of the guide path consists of an arc having as center the point connecting the main flap with the two-armed lever in the position occupied by the main flap for approaching.

Figure 2:
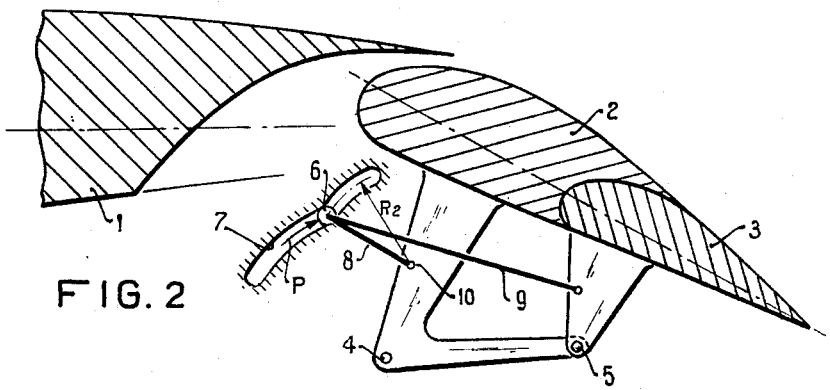
Figure 3:
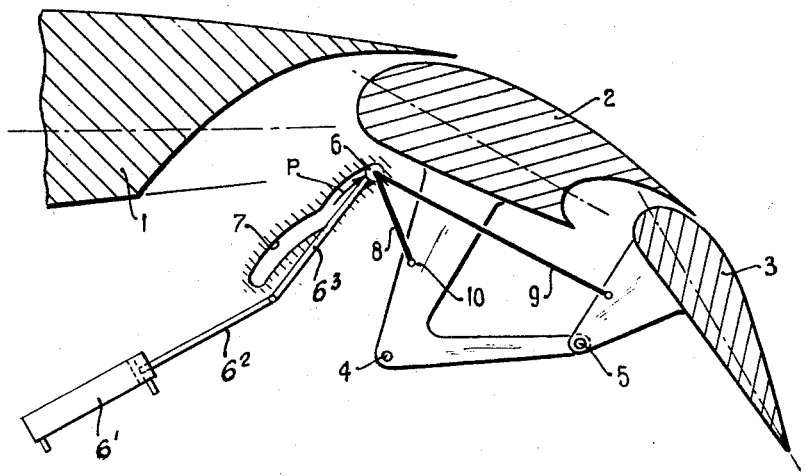

With these and other objects in view which will become apparent in the following detailed description, the present invention will be clearly understood in connection with the accompanying drawings, in which:

Figures 1, 2 and 3 show schematically sections of a wing provided with a main flap and an auxiliary flap according to the present invention, in the positions for normal flight, for approaching and for landing respectively; and Figs. 4 to 6 and 7 to 9 show corresponding sections of a second and a third embodiment.

Referring now to the drawing, and in particular to Figs. 1 to 3, a portion 1 of the wing cooperates with a main flap 2 and an auxiliary flap 3, respectively. In the position for approaching, according to Fig. 2, the main flap 2 and the auxiliary flap 3 are moved as a unit with respect to the stationary transverse hinge shaft 4 of the main flap. In the position for landing, according to Fig. 3, the main flap 2 has not been further moved with respect to Fig. 2. The auxiliary flap 3, however, has been moved with respect to the second transverse hinge shaft 5 carried by the main flap 2. These different positions are applied in a similar way to the aircraft wing according to U.S. Patent No. 2,404,956.

According to the present invention the main flap 2 as well as the auxiliary flap 3 are actuated by the same force P. This force actuates the guiding roll 6 which is guided in the stationary guiding path 7. The force P which actuates the guiding roll 6 may be applied by example by a hydraulic or pneumatic servo-mechanism 6' which reciprocates a piston rod $6^2$, pivoted to a coupling rod $6^3$, one end of which engages the guiding roll 6. The guiding roll 6 is linked to the main flap 2 by a swing rod 8 and to the auxiliary flap 3 by a swing rod 9. As shown in Figs. 1 to 3 of the drawing, the stationary guide path 7 has such a form that the first portion consists of an arc having a radius R1 and the first transverse hinge shaft 4 as center. The second portion of the stationary guide path 7 consists of an arc having a radius R2 and as center the point 10 at which the main flap 2 is connected to the swing rod 8 in the position for approaching according to Fig. 2, the radius having the length of said swing rod 8. Exclusively by causing an actuating force P to act on the guiding roll 6, the flaps 2 and 3 can be placed into the desired positions, it being of importance that only predetermined positions will be possible and undesired positions are excluded. The position used on taking off is not indicated in the drawing, but it is common practice to choose herefor a position lying between the position for normal flight shown by Figure 1 and the position for approaching of Figure 2. In this position the guiding roll 6 will be situated in the position indicated in dotted lines by 6' in Figure 1.

Figure 4:
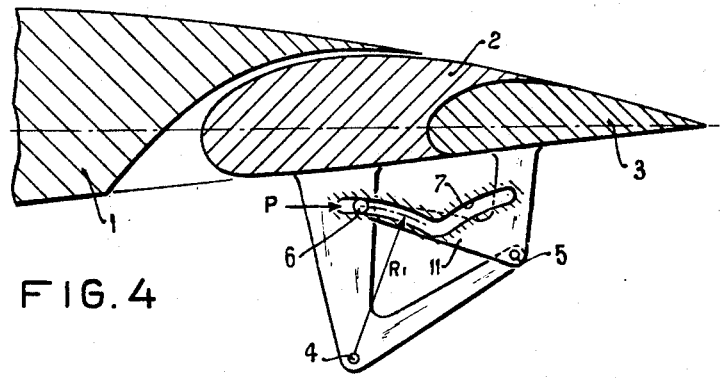
Figure 5:
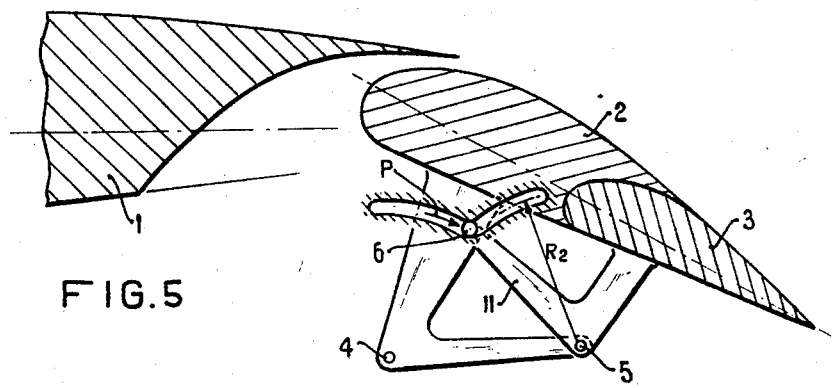
Figure 6:
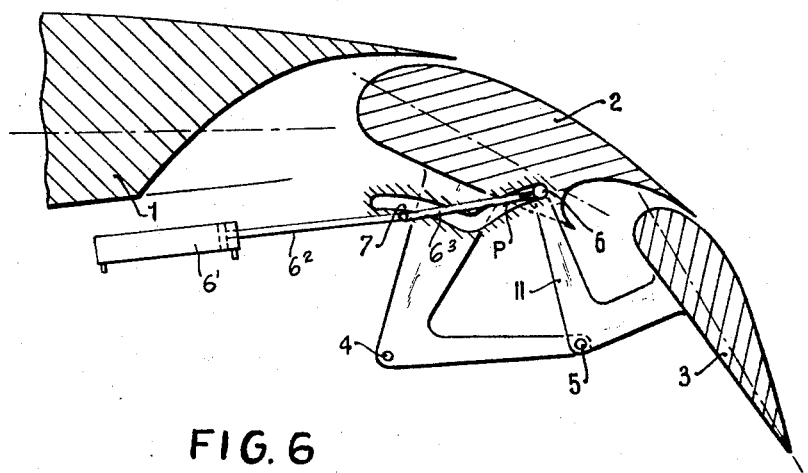

Referring now to the embodiment disclosed in Figs. 4 to 6, the actuating force acts again on the guiding roll 6 of the stationary guide path 7. The guiding roll 6 is rotatable relatively to the extremity of the stationary arm 11 of the auxiliary flap. The first portion of the guide path 7 consists of an arc with radius R1 and the transverse hinge shaft 4 as center. The second portion of the guide path 7 consists of an arc with radius R2 and having as center the transverse hinge shaft 5 in the position occupied by the main flap for approaching according to Fig. 5.

Figure 7:
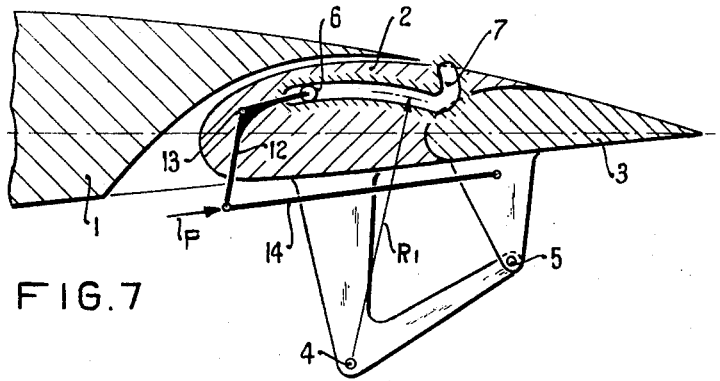
Figure 8:
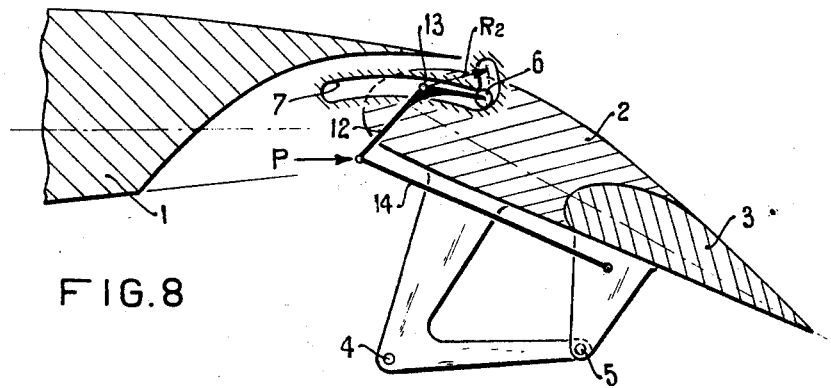
Figure 9:
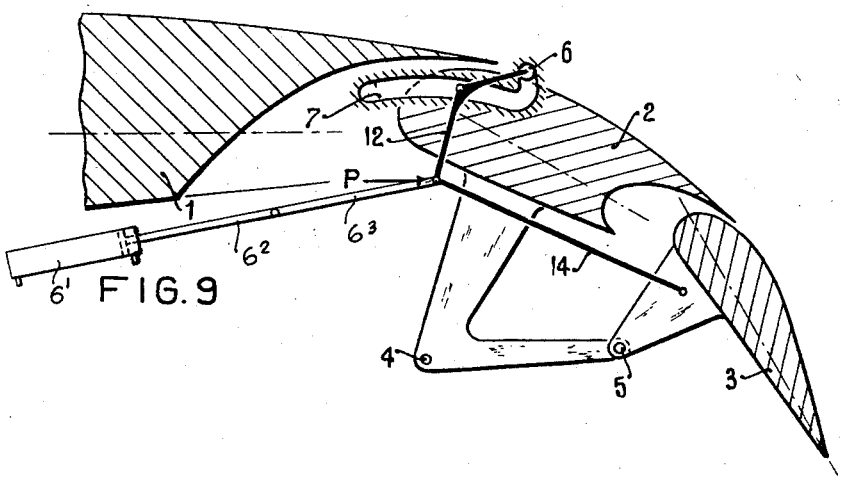

Referring now to the embodiment disclosed in Figs. 7 to 9, the two-armed lever 12 is carried by the main flap 2 in the pivot 13. One arm of the lever 12 carries the guiding roll 6 of the stationary guide path 7. The other arm of the lever 12 is controlled by the force P, said arm being at the same time hingedly connected to the swing rod 14, which is connected to the auxiliary flap 3. The first portion of the guide path 7 consists of an arc with radius R1 and the transverse hinge shaft 4 as center. The second portion of the guide path 7 consists of an arc with the radius R2, the length of which is equal to that of the one lever arm, and has as center the point of rotation 13 of the main flap 2 in the position according to Fig. 8 in which the main flap 2 occupies the position for approaching.

The connections between the guide path 7 and the wing structure have been omitted from the drawings for greater clarity; but it is to be understood that the guide path is maintained in fixed relation to the main wing portion 1 and does not move with either of the flap members 2 or 3.

The embodiments described above are provided with existing transverse hinge shafts 4 and 5. It is, however, also possible to use virtual transverse hinge shafts and to substitute then the stationary transverse hinge shaft 4 by a stationary guide path in the form of an arc having its center at 4, whilst the transverse hinge shaft 5 carried by the main flap 2 can be replaced by a guide path for the auxiliary flap 3 in the form of an arc having the virtual point of rotaiton 5 as center, said guide path being carried by the main flap 2.

In the wing construction according to the present invention it is possible to dispose the various operating and connecting members in such a way that they leave the slots occurring between the wing and the flaps in the positions for taking off, approaching or landing completely free, so that the effect of the respective slots is appreciably improved.

While I have disclosed several embodiments of the present invention, it is to be understood that these embodiments are given by example only and not in a limiting sense, the scope of the present invention being determined by the objects and the claims.

I claim:

1. An aircraft wing provided at the trailing portion with a main flap and an auxiliary flap, said flaps joining the wing profile in the position for normal flight, said main flap and said auxiliary flap being, in the position for taking off and for approaching, turned as a unit with respect to said wing upon a first center fixed with respect to said wing, and in the position for landing, said auxiliary flap being turned with respect to said main flap upon a second center fixed with respect to said main flap, and a guide path in the shape of a first arc and a second arc, said guide path being fixed with respect to said wing but relatively movable with respect to said main flap, said first arc communicating with and extending in a different direction than said second arc, a guide roll movable along said guide path, said first center forming the center for said first arc, and a rod system coupling said guide roll to said flaps.

2. The aircraft wing, as set forth in claim 1, which includes operating means acting directly on said guide roll.

3. The aircraft wing, as set forth in claim 1, which includes a lever having two arms, said guide roll being carried on the free end of one of said arms, and the pivot of said lever turning about said first center.

4. The aircraft wing, as set forth in claim 3, which includes a swing rod connecting the free end of the other of said arms to said auxiliary flap.

5. The aircraft wing, as set forth in claim 1, which includes a first swing rod coupling said guide roll to said main flap, and a second swing rod coupling said guide roll to said auxiliary flap, and the center of said second arc being formed by the point connecting said main flap to said first swing rod and the radius of said second arc being of a length equal with that of said first swing rod.

6. The aircraft wing, as set forth in claim 3, wherein said pivot of said lever forms the center of said second arc.

References Cited in the file of this patent

UNITED STATES PATENTS

| 2,155,546 | Hill | Apr. 25, 1939 |
| 2,404,956 | Gouge | July 30, 1946 |